(12) United States Patent
Witschnig et al.

(10) Patent No.: US 8,519,825 B2
(45) Date of Patent: Aug. 27, 2013

(54) RFID TRANSPONDER

(75) Inventors: Harald Witschnig, Linz (AT); Elisabeth Sonnleitner, Graz (AT)

(73) Assignee: NXP B.V., Eindhoven (NL)

( * ) Notice: Subject to any disclaimer, the term of this patent is extended or adjusted under 35 U.S.C. 154(b) by 462 days.

(21) Appl. No.: 12/993,545

(22) PCT Filed: May 13, 2009

(86) PCT No.: PCT/IB2009/051981
§ 371 (c)(1),
(2), (4) Date: Nov. 19, 2010

(87) PCT Pub. No.: WO2009/141763
PCT Pub. Date: Nov. 26, 2009

(65) Prior Publication Data
US 2011/0084810 A1    Apr. 14, 2011

(30) Foreign Application Priority Data
May 19, 2008  (EP) .................................. 08104017

(51) Int. Cl.
*G06K 7/01*    (2006.01)
(52) U.S. Cl.
USPC ........................................ 340/10.1; 375/141
(58) Field of Classification Search
USPC ........................................................ 340/10.1
See application file for complete search history.

(56) References Cited

U.S. PATENT DOCUMENTS

| 5,325,401 A | 6/1994 | Halik et al. |
| 6,108,367 A | 8/2000 | Herman et al. |
| 2007/0069864 A1* | 3/2007 | Bae et al. ..................... 340/10.2 |
| 2008/0065957 A1* | 3/2008 | Shoarinejad et al. ......... 714/758 |

FOREIGN PATENT DOCUMENTS

| EP | 0045260 A1 | 2/1982 |
| EP | 0706151 A2 | 4/1996 |
| JP | 2005 151075 A | 6/2005 |
| WO | 2004/049663 A1 | 6/2004 |

OTHER PUBLICATIONS

International Search Report for Application PCT/IB2009/051981 (Sep. 16, 2009).

* cited by examiner

*Primary Examiner* — Brian A. Zimmerman
*Assistant Examiner* — Omer S Khan

(57) ABSTRACT

An RFID transponder (1) comprises a demodulator (3) for demodulating received phase modulated carrier signals (CSQ), converting them down to a modulated baseband signal (MS) and filtering the converted signal. Sampling means (7) sample the filtered signal (FS) and store an actual sampling value (S(t0)) and a previous sampling value (S(t1)) of the filtered signal (FS). Subtracting means (8) calculate a difference (DS) between the actual sample value (S(t0)) and the previous sample value (S(t1)). Difference evaluation means (9) evaluate the difference (DS) according to the following criteria: a. if the difference is positive and outside of a predefined zero range (ZR) a first logical value is determined; b. if the difference is negative and outside of the zero range a second logical value is determined; c. if the difference is within the zero range the logical value of the latest evaluation is kept.

6 Claims, 5 Drawing Sheets

RFID TRANSPONDER

FIELD OF THE INVENTION

The invention relates to an RFID transponder comprising a transponder air interface for receiving phase modulated radio frequency carrier signals.

BACKGROUND OF THE INVENTION

In a conventional high frequency RFID system comprising at least one RFID reader and multiple RFID transponders (e.g. operating at 13.56 MHz, with data transmission from the RFID reader to the RFID transponder by means of phase modulation, and from the RFID transponders to the RFID reader by means of load modulation) electric energy is transmitted via an electromagnetic field from the reader to the transponders in order to supply the transponders with energy. In order to enable the transponders to receive the energy with a high energy level; their transponder air interfaces should be designed to have a high quality factor. However, disadvantageously, a very high quality factor has a negative influence on the whole RFID system insofar as it makes it difficult to achieve a very high data transmission rate between the transponders and the reader. The reason for this behavior of the RFID system is that increasing the quality factor of the air interface of a transponder is equivalent to reducing the frequency band width in respect of a given center frequency, which results in longer swing-out transients of various oscillating circuits employed in the RFID system. As a consequence, in known RFID systems a compromise between an extent of the quality factor and an intended data rate between the transponder and the reader has to be made.

Further, national and international standards limit both the theoretically available frequency bandwidths and the energy levels of signals being transmitted in the RFID systems, thereby barring a possible solution of the reciprocal relation between quality factors and data rates in RFID systems.

However, future applications of RFID systems (in particular Near Field Communication Systems (NFC)) will depend on higher data transmission rates than hitherto have been achievable. An example of such an application could be an electronic passport system having photographs, fingerprints and other biometric data stored in a built-in RFID transponder, which also requires fast data communication from the RFID reader to the RFID transponders for interrogating the RFID transponders quickly.

FIG. 1 shows a block circuit diagram of a prior art demodulator 10 for demodulating phase modulated input signals PM. The demodulator shown in FIG. 1 comprises a multiplier 11 for multiplying the phase modulated input signal PM with a cosine reference signal RCOS. The output signal P1 of the multiplier 11 is fed to a matched filter 12 and the filtered output signal P2 of the matched filter 12 is fed to a threshold detector 13 which compares the amplitude of the filtered signal P2 with a threshold and—depending whether the amplitude of the filtered signal P2 is above or below said threshold—determines the current binary state B of the filtered signal P2. A disadvantage of this known implementation is that the threshold detector 13 is very sensitive to distortions of the phase modulated input signal PM caused by high quality factors.

EP 0 045 260 B1 discloses a demodulator of signals modulated in accordance with a continuous phase modulation for the transmission of binary data. This document explains the principal means and processes employed in phase modulating/demodulating systems.

OBJECT AND SUMMARY OF THE INVENTION

It is therefore an object of the present invention to provide an RFID transponder having a receiving structure that can cope with the above explained effects of the quality factor and is capable of receiving phase modulated data from an RFID reader at significantly higher data rates than the actual RFID transponders.

The present invention solves this problem by providing an RFID transponder with the following characteristic features: An RFID transponder comprising a transponder air interface for receiving phase modulated radio frequency carrier signals and a demodulator for demodulating the received phase modulated carrier signals, wherein the demodulator comprises:

a down-converter being arranged for converting the phase modulated carrier signal down to a modulated baseband signal;

a filter structure for filtering the modulated baseband signal provided by the down-converter;

sampling means being adapted to sample the filtered signal provided by the filter structure and to store at least an actual sampling value and a previous sampling value of the filtered signal;

subtracting means being arranged to calculate a difference between the actual sample value and the previous sample value; and difference evaluation means being arranged to evaluate the difference according to the following criteria:
  a. if the difference has a positive sign and the difference value is outside of a predefined zero range a first logical value (e.g. 1) is determined;
  b. if the difference has a negative sign and the difference value is outside of the zero range a second logical value (e.g. 0) is determined;
  c. if the difference is within the zero range the logical value of the latest evaluation is kept.

The RFID transponder according to the present invention shows the advantage that it is robust and has a very high data detection reliability for phase modulated signals, even when the quality factor of the air interface of the RFID transponder and the overall quality factor of the RFID system is high. This allows to design RFID systems that achieve both a high energy transmission level from an RFID reader to the RFID transponders by using high quality factors and high data transmission rates from the RFID transponders to the RFID reader by using a demodulator with the characteristic features of the present invention. The RFID transponder according to the present invention can be implemented easily and cost-effective, its complexity is comparably low and the quality of detection is almost independent of the quality factor.

Easy implementation of the down-converter is achieved by configuring it as a multiplier being arranged for multiplying the phase modulated carrier signal with a reference signal.

Alternatively, in an embodiment providing high performance the down-converter is configured as sampling means being adapted to sample the phase modulated carrier signal and to calculate the modulated baseband signal from the sampled phase modulated carrier signal.

In an easy to implement and cheap embodiment of the invention the filter structure is configured as a lowpass filter.

High performance of the filter structure is achieved when it is configured as a matched filter.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1:
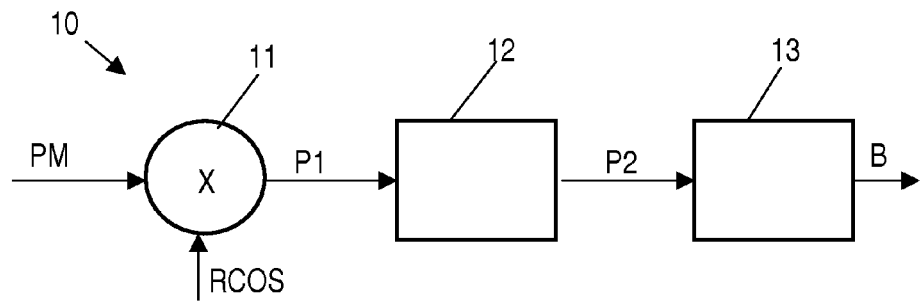
FIG. 1 shows a demodulator for phase modulated signals according to prior art.
Figure 2:
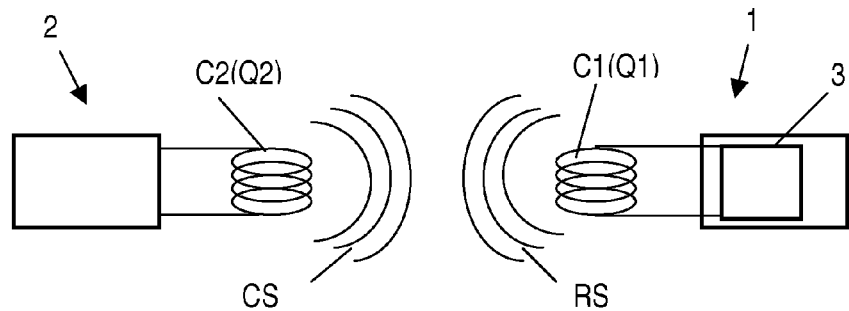
FIG. 2 shows a schematic block circuit diagram of an RFID system including an RFID transponder according to the present invention.

An implementation of an RFID system according to the present invention is now explained with reference to the schematic block circuit diagram of FIG. 2. The RFID system comprises at least one RFID transponder 1 and an RFID reader 2. In this embodiment the RFID transponder 1 is configured as a passive RFID transponder, also called tag, being wirelessly powered by a radio frequency (RF) electromagnetic field that is generated by the RFID reader 2. The RFID reader 2 comprises a reader air interface C2 with a predefined high quality factor Q2 for transmitting the radio frequency electromagnetic field which comprises phase modulated radio frequency carrier signals CS having a given frequency, e.g. 13.56 MHz. Usually, the carrier signal CS has a sinusoidal form. As known to those skilled in the art, the signals modulating the carrier signal have a frequency range within a predefined baseband. It should be emphasized that the term "electromagnetic field" as used herein comprises electric, magnetic and mixed electromagnetic fields depending on the frequency of the field. In the 13.56 MHz range the magnetic field in the near field is prevailing, whereas in UHF systems between 800 and 900 MHz a mixed electromagnetic field is propagating.

The reader air interface C2 also receives load-modulated data signals DS from the RFID transponder 1. The RFID reader 2 may be selected from presently available conventional RFID reader models.

In order to receive as much energy as possible from the carrier signal CS the transponder air interface C1 of the RFID transponder 1 is designed with a relatively high quality factor Q1 adjusted to the frequency of the carrier signal CS. The RFID transponder 1 is further adapted to transmit data signals RS via the transponder air interface C1 by means of load modulating the carrier signals CS of the received electromagnetic field. However, data transmission from the RFID transponder 1 to the RFID reader 2 is not an object of the invention. Rather, it is carried out as known by those skilled in the art and hence, further explanations are not necessary.

It should be noted that the term "phase modulated signals" as used herein also comprises any kind of phase shift keying (PSK) which is used in digital modulation systems for phase modulation of signals that have only two different conditions (i.e. 0 and 1). Binary phase shift keying (BPSK) is the simplest form of PSK. It uses two different phases of a carrier signal that are separated by 180° from each other.

Figure 4:
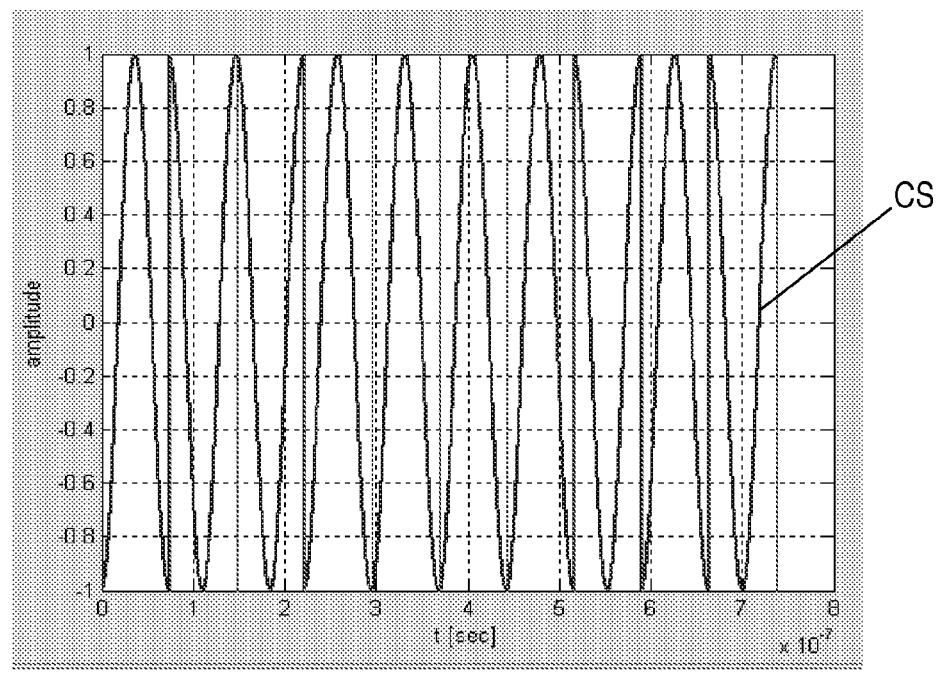
FIG. 4 shows a timing chart of a phase modulated carrier signal transmitted by an RFID reader.
Figure 5:
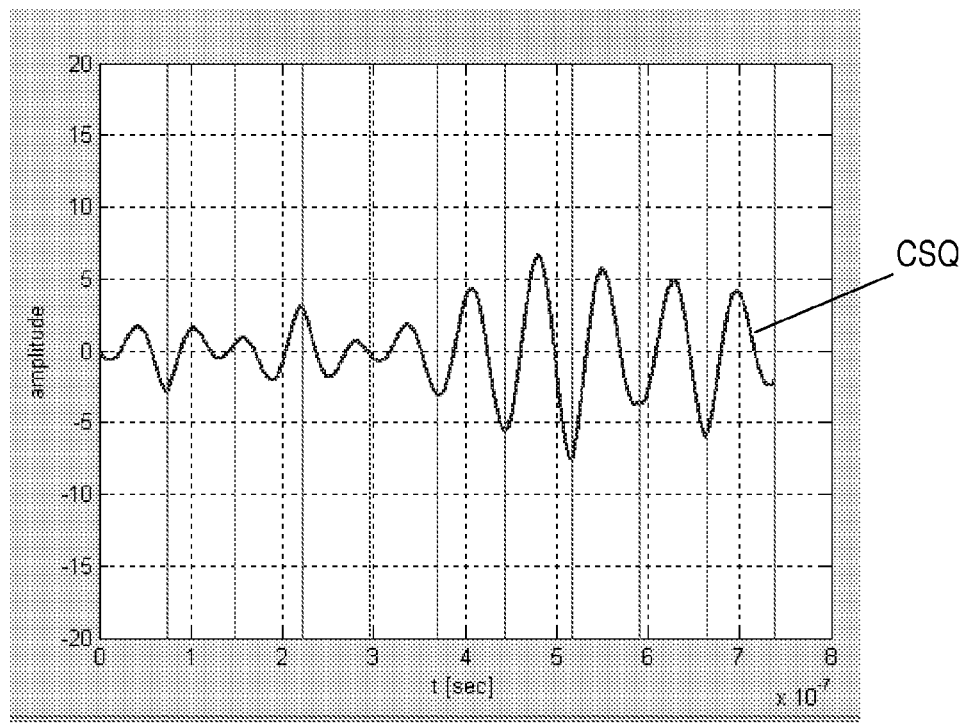
FIG. 5 shows a timing chart of the phase modulated carrier signal as received by the RFID transponder, which signal show the influences of the quality factor of the RFID system.

It should further be noted that the phase modulated carrier signal CS sent by the RFID reader 2, which signal is shown in the timing chart of FIG. 4 does not longer have this ideal signal shape after having passed the air transmission path between the RFID reader 2 and the RFID transponder 1 and the transponder air interface C1, but due to the overall quality factor of the RFID system has become a quality factor influenced phase modulated carrier signal CSQ (shown in the timing chart of FIG. 5) which is fed to a demodulator 3 of the RFID transponder 1.

Figure 3:
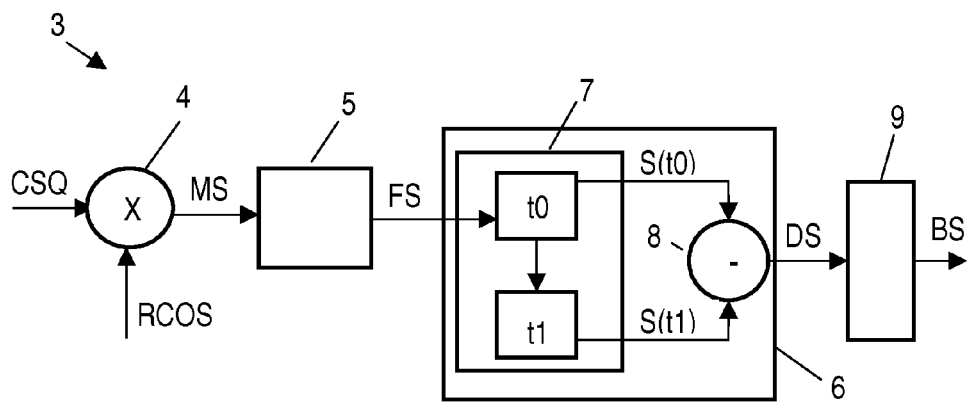
FIG. 3 shows a demodulator for phase modulated signals according to the present invention.

The demodulator 3 is adapted for demodulating the data contained in the quality factor influenced phase modulated carrier signal CSQ and will now be explained in more detail with reference to the block circuit diagram of FIG. 3. The demodulator 3 comprises a down-converter 4 being generally arranged for converting the quality factor influenced phase modulated carrier signal CSQ down to a modulated baseband signal MS. Specifically, in this embodiment the down converter 4 is configured as a multiplier being adapted to multiply the quality factor influenced phase modulated carrier signal CSQ with a (cosine) reference signal RCOS. Alternatively, the down-converter 4 can be configured as sampling means being adapted to sample the quality factor influenced phase modulated carrier signal QCS and to calculate the modulated baseband signal MS from the sampled signals.

Figure 6:
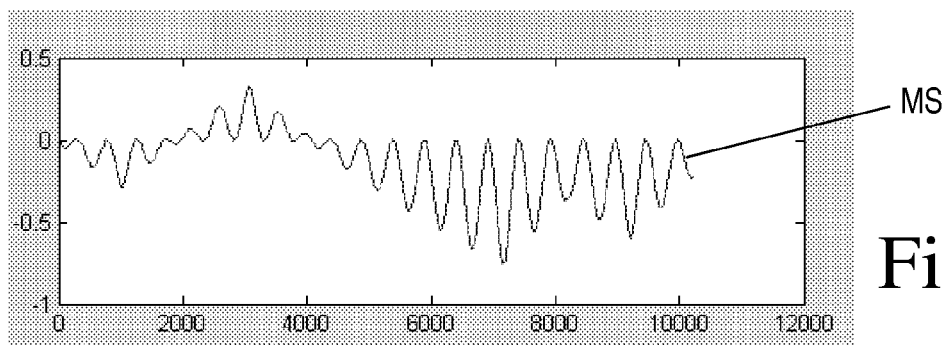
FIG. 6 shows a timing chart of the quality factor influenced phase modulated carrier signal after having been multiplied with a reference signal in the demodulator according to the invention.

The output signal of the down-converter 4, i.e. the modulated baseband signal MS of the down-converter 4, which is shown in the timing chart of FIG. 6, is then fed to a filter structure 5. The filter structure 5 can either be configured as a stand-alone component or may be implemented in a signal processor. In a simple form the filter structure 5 is configured as a lowpass filter. High filtering performance is achieved when the filter structure 5 is adapted as a matched filter.

Figure 7:
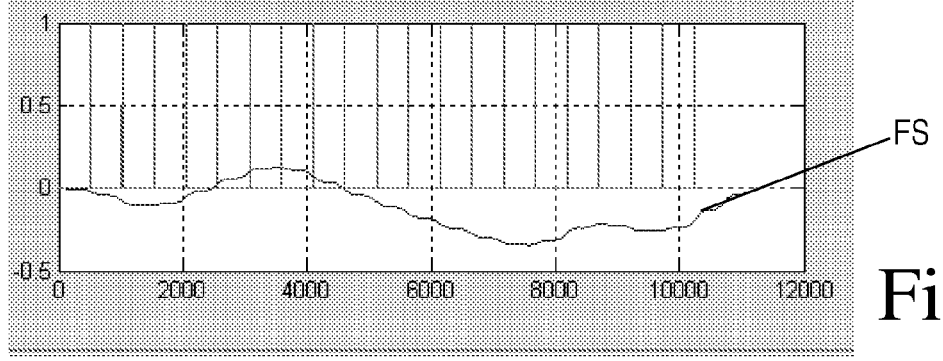
FIG. 7 shows a timing chart of the signal of FIG. 6 after having been filtered in a filter structure.
Figure 8:
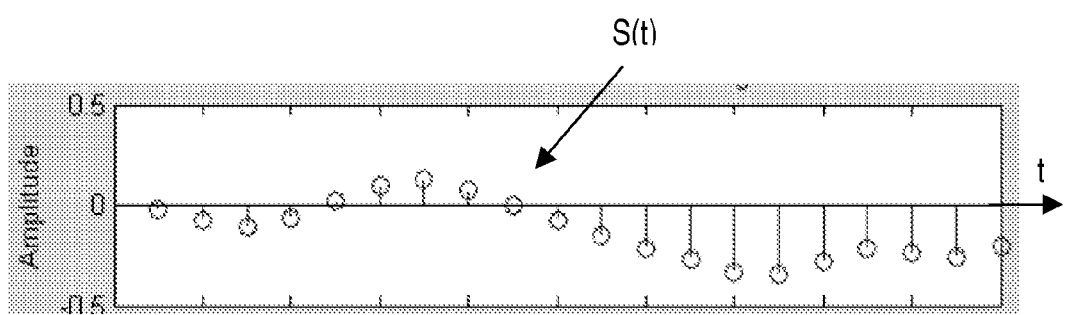
FIG. 8 shows a timing chart of sample values of the filtered signal of FIG. 7.

The filtered output signal FS (shown in the timing chart of FIG. 7) of the filter structure 5 is fed to difference calculation means 6 which comprise sampling means 7 being adapted to sample the filtered signal FS with a predefined sampling rate and to store at least an actual sampling value $S(t0)$ and a previous sampling value $S(t1)$ of the filtered signal FS. A sequence of sample values $S(t)$ is shown in the timing chart of FIG. 8. The difference calculation means 6 further comprise subtracting means 8 being arranged to calculate the difference between the actual sample value $S(t0)$ and the previous sample value $S(t1)$. The difference signal DS generated by the subtracting means 8 is shown in the timing diagram of FIG. 9. The difference signal DS is then fed to difference evaluation means 9. These difference evaluation means 9 evaluate the fed difference signal DS according to the following criteria:

1. If the difference has a positive sign, a first logical value (e.g. 1) is determined.
2. If the difference has a negative sign, a second logical value (e.g. 0) is determined.
3. If the difference is zero, the logical value of the latest evaluation is kept.

In order to avoid that signal noise etc. which will always be present in implementation of electronic circuits influence the results of the difference evaluation a zero range instead an exact zero value can be used to determine whether the bit value has been unchanged since the latest evaluation. Hence, the criteria have to formulated as follows:
1. If the difference has a positive sign and the difference value is outside of a predefined zero range ZR, a first logical value (e.g. 1) is determined.
2. If the difference has a negative sign and the difference value is outside of the zero range ZR, a second logical value (e.g. 0) is determined.
3. If the difference is within the zero range ZR, the logical value of the latest evaluation is kept.

The first established set of criteria is to be regarded as a special solution of the generalized second set of criteria, since it results from setting the zero range ZR to a range width of 0.

Figure 9:
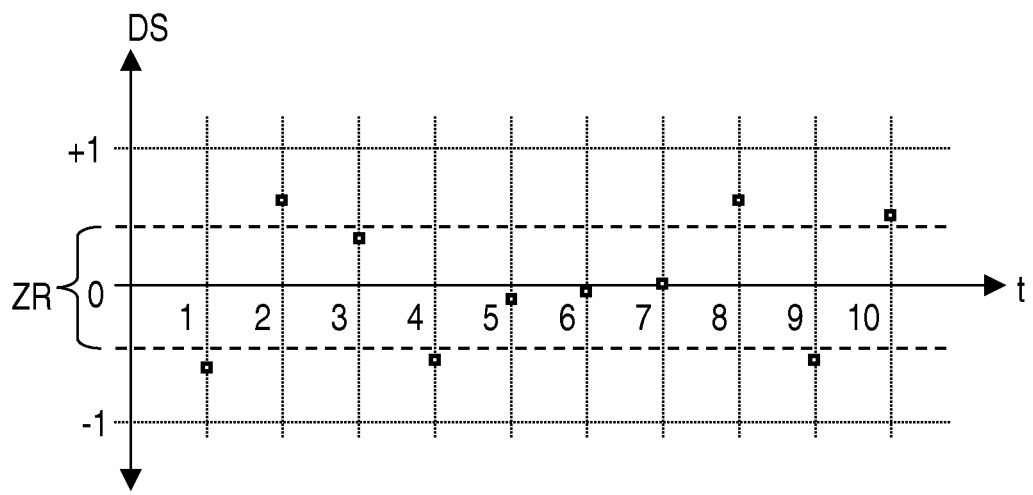
FIG. 9 shows a timing chart of a difference signal, obtained by periodically generating the difference between an actual sampling value and a previous sampling value.

Referring to the timing diagram of FIG. 9 which shows exemplary difference values DS it will be recognized that the first difference value is negative and below a predefined zero range ZR, hence outside the zero range ZR. Consequently, the resulting bit value is determined to have a first logical value, here 0. The second difference value is positive and above the zero range ZR, hence outside the zero range ZR. Consequently, the resulting bit value is determined to have a second logical value, here 1. The third difference value is slightly positive, but within the zero range ZR. Therefore, the previous bit value 1 is kept. The fourth difference value is negative and below the zero range ZR and is therefore determined to be 0. The fifth to seventh difference values are all within the zero range ZR and hence the logical value 0 is kept for all assigned bits. The eighth to tenth difference values are above, below and above the zero range, respectively, therefore the bit values are determined to be 1, 0, 1, respectively.

Figure 10:
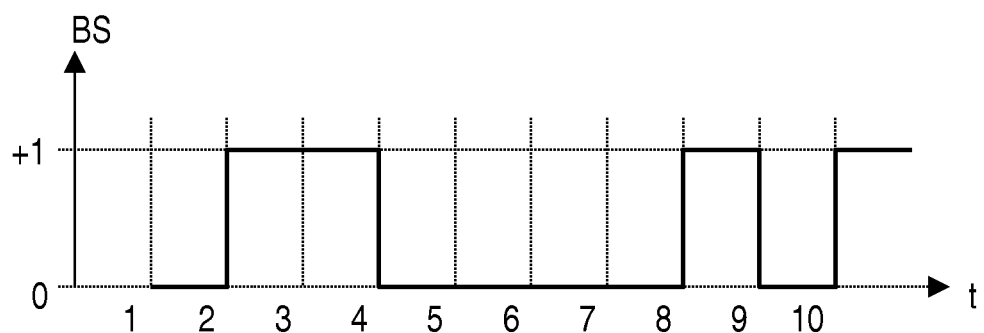
FIG. 10 shows a bit stream generated from the difference signal according to the present invention.

The output signal of the difference evaluation means 9 is a bit stream BS which is shown in the timing chart of FIG. 10.

Figure 11:
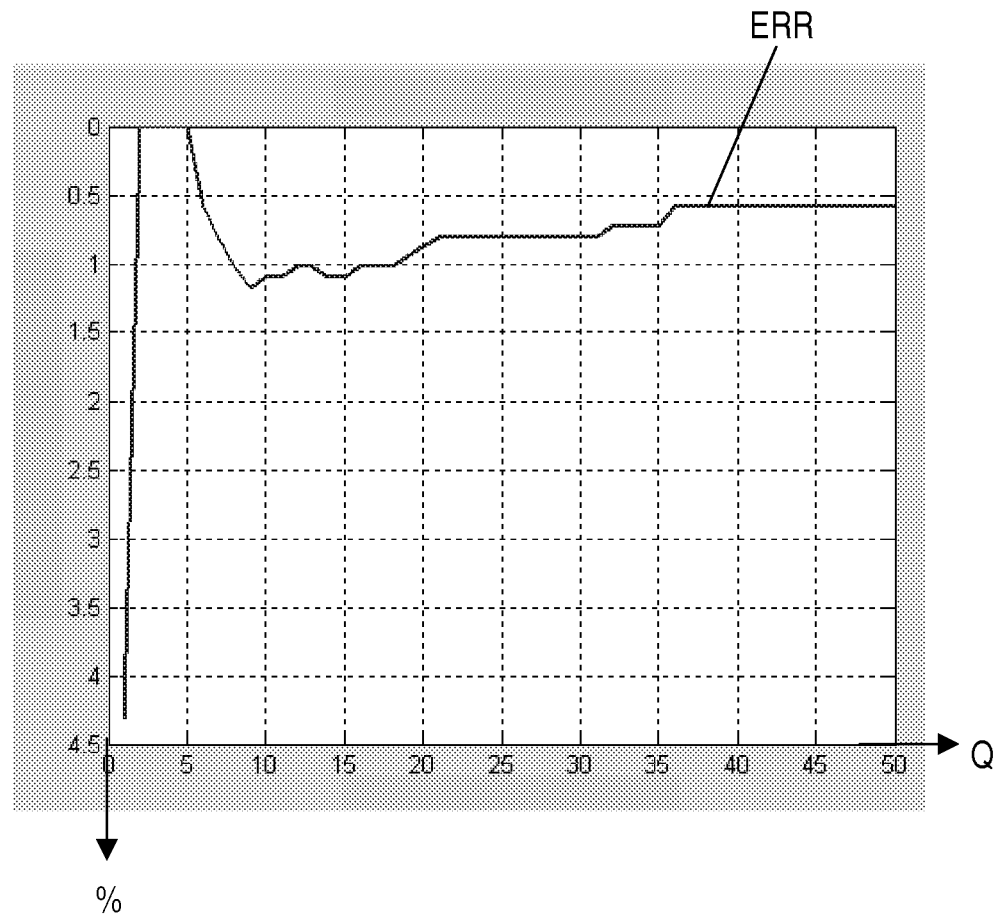
FIG. 11 shows a chart of a bit error rate over the quality factor in an RFID system according to the present invention.

Compared to prior art RFID transponders, the signal evaluation according to the present invention is by far more robust to signal distortions of the phase modulated carrier signal CS caused by high quality factors of the RFID system. Indeed, it is almost independent from the applied quality factor Q as shown in FIG. 11, which depicts a chart of the bit error rate ERR expressed in a percentage of the erroneous values over the quality factor Q. It will be appreciated that the achieved bit error rate ERR is very low, allowing to dramatically increase the data transmission rate from the RFID reader 2 to the RFID transponder 1 and at the same time designing the RFID system with high quality factors Q, such that a high energy level is transmittable for supplying the RFID transponder 1.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An RFID transponder comprising a transponder air interface for receiving phase modulated radio frequency carrier signals and a demodulator for demodulating the received phase modulated carrier signals, wherein the demodulator comprises:
    a down-converter arranged for converting the phase modulated carrier signal down to a modulated baseband signal;
    a filter structure for filtering the modulated baseband signal provided by the down-converter;
    a sampler adapted to sample the filtered signal provided by the filter structure and to store at least an actual sampling value and a previous sampling value of the filtered signal;
    a subtractor arranged to calculate a difference between the actual sample value and the previous sample value; and
    a difference evaluator arranged to evaluate the difference according to the following criteria:
        if the difference has a positive sign and the difference value is outside of a predefined zero range a first logical value is determined;
        if the difference has a negative sign and the difference value is outside of the zero range a second logical value is determined;
        if the difference is within the zero range the logical value of the latest evaluation is kept.

2. The RFID transponder as claimed in claim 1, wherein the down-converter is configured as a multiplier arranged for multiplying the phase modulated carrier signal with a reference signal.

3. The RFID transponder as claimed in claim 1, wherein the down-converter is configured to sample the phase modulated carrier signal and to calculate the modulated baseband signal from the sampled phase modulated carrier signal.

4. The RFID transponder as claimed in claim 1, wherein the filter structure is configured as a lowpass filter.

5. The RFID transponder as claimed in claim 1, wherein the filter structure is configured as a matched filter.

6. An RFID transponder comprising a transponder air interface for receiving phase modulated radio frequency carrier signals and a demodulator for demodulating the received phase modulated carrier signals, wherein the demodulator comprises:
    a down-converter arranged for converting the phase modulated carrier signal down to a modulated baseband signal;
    a filter structure for filtering the modulated baseband signal provided by the down-converter;
    a sampler adapted to sample the filtered signal provided by the filter structure and to store at least an actual sampling value and a previous sampling value of the filtered signal;
    a subtractor arranged to calculate a difference between the actual sample value and the previous sample value; and
    a difference evaluator arranged to evaluate the difference according to the following criteria:
        if the difference has a positive sign, a first logical value is determined;
        if the difference has a negative sign, a second logical value is determined;

if the difference is zero, the logical value of the latest evaluation is kept.

* * * * *